United States Patent
Stephens et al.

(10) Patent No.: US 8,150,964 B2
(45) Date of Patent: Apr. 3, 2012

(54) WIRELESS INDUSTRIAL DATA TRANSMISSION SYSTEM

(75) Inventors: Alexander R. Stephens, Moro Bay, CA (US); Leslie W. Wolff, Goleta, CA (US); Michael B. Stephens, Nipomo, CA (US)

(73) Assignee: Custom Sensors & Technology, Goleta, CA (US)

( * ) Notice: Subject to any disclaimer, the term of this patent is extended or adjusted under 35 U.S.C. 154(b) by 1262 days.

(21) Appl. No.: 11/753,725

(22) Filed: May 25, 2007

(65) Prior Publication Data

US 2008/0293364 A1    Nov. 27, 2008

(51) Int. Cl.
   G06F 15/173    (2006.01)
(52) U.S. Cl. ........................................ 709/224
(58) Field of Classification Search ............... 709/224
   See application file for complete search history.

(56) References Cited

U.S. PATENT DOCUMENTS

| | | | | |
|---|---|---|---|---|
| 6,018,543 | A * | 1/2000 | Blois et al. | 375/133 |
| 6,185,709 | B1 * | 2/2001 | Dreibelbis et al. | 714/726 |
| 6,442,176 | B1 * | 8/2002 | Yahagi | 370/474 |
| 7,016,970 | B2 * | 3/2006 | Harumoto et al. | 709/233 |
| 7,389,348 | B2 * | 6/2008 | Boehmke | 709/224 |
| 7,558,868 | B2 * | 7/2009 | Miyazawa et al. | 709/231 |
| 7,643,516 | B2 * | 1/2010 | Degenhardt et al. | 370/516 |
| 7,660,858 | B2 * | 2/2010 | Tsutsui | 709/206 |
| 2001/0032025 | A1 * | 10/2001 | Lenz et al. | 700/28 |
| 2004/0172220 | A1 * | 9/2004 | Prekeges et al. | 702/186 |
| 2005/0271039 | A1 * | 12/2005 | Boehmke | 370/351 |
| 2006/0025872 | A1 | 2/2006 | Glanzer | |
| 2006/0136170 | A1 * | 6/2006 | Skinner | 702/150 |
| 2006/0245471 | A1 * | 11/2006 | Molisch | 375/138 |
| 2008/0161691 | A1 * | 7/2008 | Zhang et al. | 600/453 |

FOREIGN PATENT DOCUMENTS

| | | |
|---|---|---|
| EP | 1686732 A | 8/2006 |
| JP | 02 269544 A | 11/1990 |
| JP | 05 158723 A | 6/1993 |

OTHER PUBLICATIONS

Nan, Jiang, Estimating Missing Data in Data Streams, Jan. 2007, The University of Oklahoma.*
Mihail Halatchev, Estimating Missing Value in Related Sensor Data Streams, Jan. 2005, The University of Oklahoma.*

* cited by examiner

*Primary Examiner* — Krista Zele
*Assistant Examiner* — Arvin Eskandarnia
(74) *Attorney, Agent, or Firm* — Gilman Clark & Hunter, LLC

(57) ABSTRACT

A wireless data transmission system incorporates a process sensor providing an output for process monitoring data with a transmitter connected to the output of the sensor and transmitting the data in time gated intervals. A receiver receives the data from the transmitter and a determination is made if new data is received at a gated time interval. A processor connected to the receiver calculates process parameters based on the data received and a set of the calculated process parameters is stored. The processor estimates process parameters based on the stored set of calculated process parameters responsive to a signal from the determination that data packets have not been received at the gated interval. The process parameters front actual data, if present, or from the estimates made by the processor are then output for process control. A counter responsive to the determination of lost data, provides an emergency stop signal upon reaching a predetermined number of counts.

19 Claims, 5 Drawing Sheets

WIRELESS INDUSTRIAL DATA TRANSMISSION SYSTEM

BACKGROUND

1. Field of the Invention

This invention relates generally to the field of wireless communications systems, and more particularly, to a data transmission system with low latency and data security for process control employing estimating capability for missed data transmissions with predetermined shutdown criteria.

2. Description of the Related Art

Industrial data systems typically rely on direct or hardwired control and feedback systems for process control. Simplicity and reliability of these direct control systems is highly desirable in a manufacturing or process control environment. However, in certain instances, for example in rotating or other mechanical system operation where slip rings or other moving electrical connections are required for circuit continuity, wireless communications has become a preferred alternative to reduce mechanical complexity and increase reliability.

Industrial data transmission systems for process control typically rely on data re-transmission, data encryption and encoding for error correction to assure data reliability. In many applications, short term deviations from absolute accuracy of data magnitude or value are not detrimental to process control. The complexity of processes for assuring data integrity is unwarranted, or in certain cases may result in loss of reliability when data transmissions are temporarily interrupted or "dropped" and cannot be recovered by the system. Latency issues or data rate fluctuations may result based on data re-transmission for recovery. In the industrial environment, machinery and other interference sources often provide an extremely "noisy" environment, for radio transceivers which often results in dropped data or requires higher power transceiver systems to assure communications continuity.

It is therefore desirable to provide a wireless data transmission system which provides reduced latency with low power while increasing reliability in a transmission environment where interruption or dropping of data is likely.

SUMMARY

In exemplary embodiments a wireless data transmission system incorporates a process sensor providing an output for process monitoring data with a transmitter connected to the output of the sensor and transmitting the data in time gated intervals. A receiver receives the data from the transmitter and a determination is made if new valid data is received at a gated time interval. A processor connected to the receiver calculates process parameters based on the data received and a set of the calculated process parameters is stored. The processor estimates process parameters based on the stored set of calculated process parameters responsive to a signal from the determination that valid data has not been received at the gated interval. The process parameters from actual data if present or from the estimates made by the processor are then output for process control.

The wireless data transmission system further includes a counter responsive to the determination of lost data, which provides an emergency stop signal upon reaching a predetermined number of counts.

In an exemplary embodiment the process sensor is a position sensor and the process parameters are speed and position. Estimation of the process parameters in the absence of actual data includes calculating velocity and acceleration based on the stored data and the estimated process parameters are calculated based on the velocity and acceleration.

Also in the exemplary embodiment a smoothing of process parameter output responsive to a determination of the presence of new data after a period of missed data is accomplished from estimated process parameters to actual process parameters based on data received subsequent to estimating the process parameters.

BRIEF DESCRIPTION OF THE DRAWINGS

These and other features and advantages of the present invention will be better understood by reference to the following detailed description when considered in connection with the accompanying drawings wherein.

DETAILED DESCRIPTION

Figure 1:
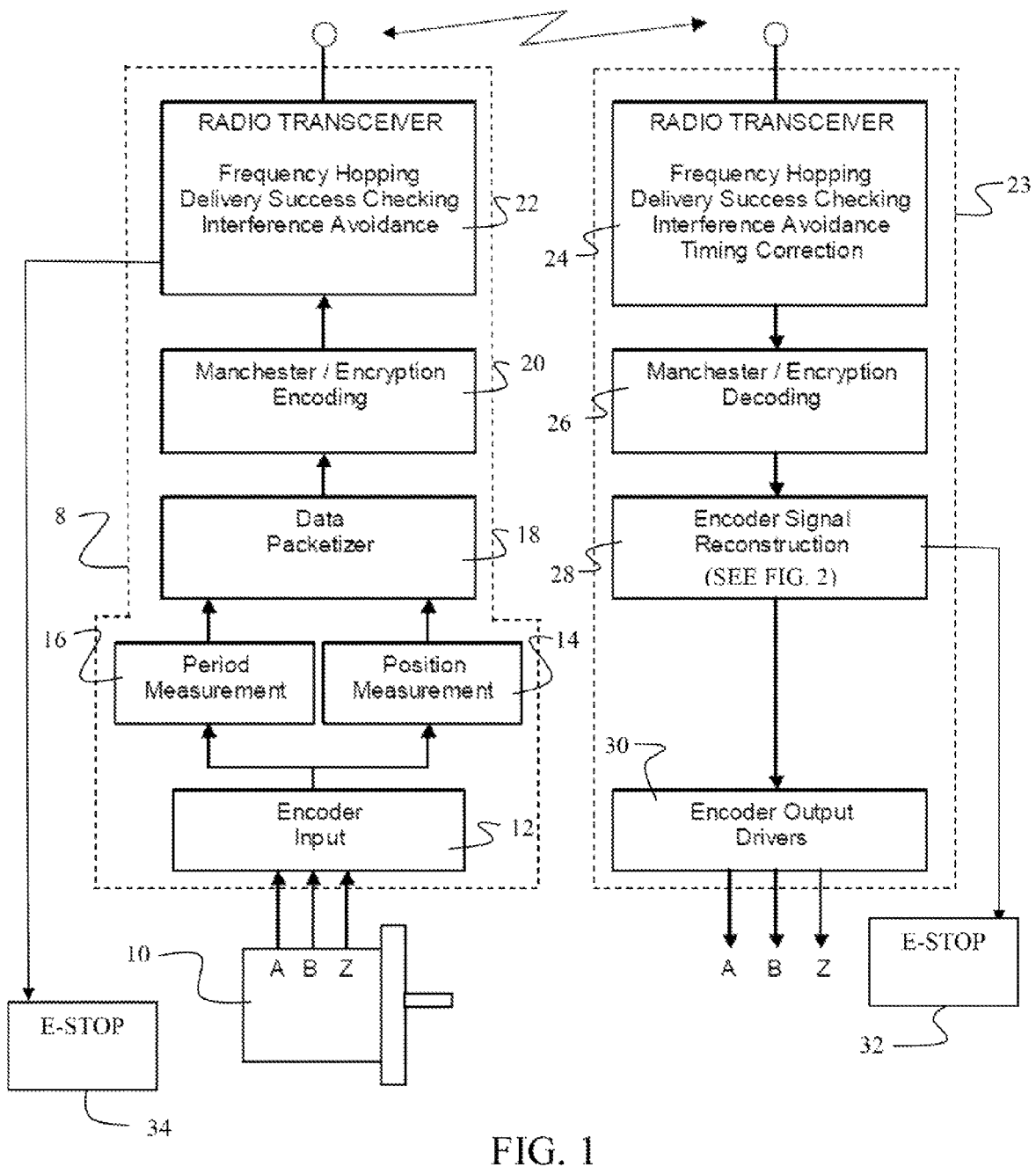
FIG. 1 is a block diagram of the system elements and transceiver sequence for a first embodiment of the present invention.

The embodiment for the present invention as disclosed herein employs a position encoder as exemplary of the process data input. As shown for a first embodiment in FIG. 1, in the transmitter element 8 of data transmission system the output signals from a position/motion sensor 10 are provided to an encoder input 12 for encoding into absolute and relative position measurements 14 provided by counts from the encoder and speed measurements 16 based on period of the counts. In an exemplary embodiment, a BEI model H25D-55-2500-ABZC-28V/5-SM18 2500 cycle rotary encoder is employed. The measurements are processed through data packetizer 18 to create data packets in appropriate transmission layer protocol. For the exemplary embodiment shown additional features are provided for encoding and security encrypting of the data using Manchester encryption 20 or alternative secure data encryption. The packetized and encoded data is then provided to radio transceiver 22 for transmission.

Transmitted data is received on the process control receiver element 23 by a second radio transceiver 24. The transceiver pair employs ISM band communication with pseudo random, frequency hopping, tracking, delivery success checking and interference avoidance in the embodiment shown. The information is transmitted (in this particular embodiment) every 600 microseconds to the corresponding receivers). Upon receipt of valid data, the receiver sends an acknowledgement message back to the transmitter. The transmitter monitors the success rate of its transmissions and adjusts the shared frequency hopping table accordingly to avoid noisy sections of the radio band. As will be discussed in greater detail subsequently, no data retransmission is made for failed transmissions allowing a very low latency. The transmitting transceiver merely records lack of an acknowledgement packet as associated with a transmission success rate for frequency control purposes. While disclosed in the embodiment herein as a radio transceiver pair, the transmitter and receiver in alternative embodiments employ optical or other transmission mediums.

Data received by the second transceiver is provided to a Manchester encryption decoder 26 provided as a feature in the exemplary embodiment, and then to a processor 28 for signal reconstruction as will be described in detail with respect to FIG. 2. The reconstructed data is then provided through output drivers 30 for use in system control.

As shown, if data loss exceeds a predetermined count in the receiver system an emergency stop command 32 is issued as a flag to the system controller to indicate loss of system control. Similarly, if the transmitting transceiver fails to receive acknowledgement packets for a predetermined number of counts (typically identical to the predetermined receiver packet loss count) the transmitter system will issue an emergency stop command 34 to the system controller.

Figure 2:
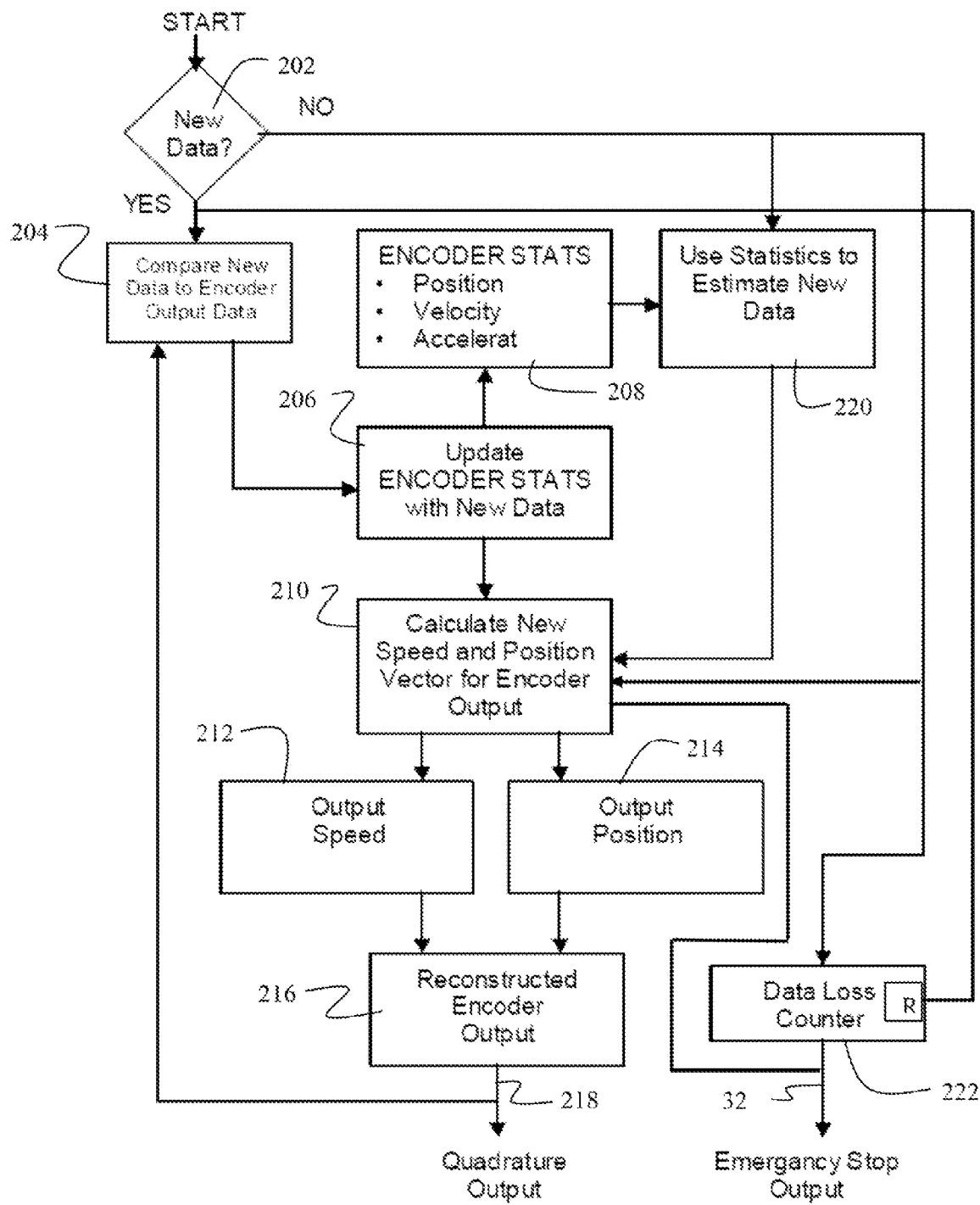
FIG. 2 is a flow chart of the operation of the system algorithm for communications processing in the exemplary embodiment.

Referring to FIG. 2 data updates containing position and/or speed information of the sensor are anticipated by a processor in the process control receiver element to be received every 600 microseconds in the exemplary embodiment. Based on a time gated entry corresponding to the transceiver cycle time, a determination is made if new data has been received 202. New data is compared to the encoder output data 204 provided by the output drivers and the processor updates the encoder statistics with new data 206. For the embodiment shown, the decoded data are employed to calculate and store position, velocity and acceleration 208 of the machine element measured by the motion/position sensor and calculate a speed and position vector for encoder output 210. Output speed 212 and output position 214 are available as alternative algorithms for control which will be described in greater detail subsequently. The reconstructed encoder output 216 is then provided as a quadrature output 218 for use by the control system.

Figure 3:
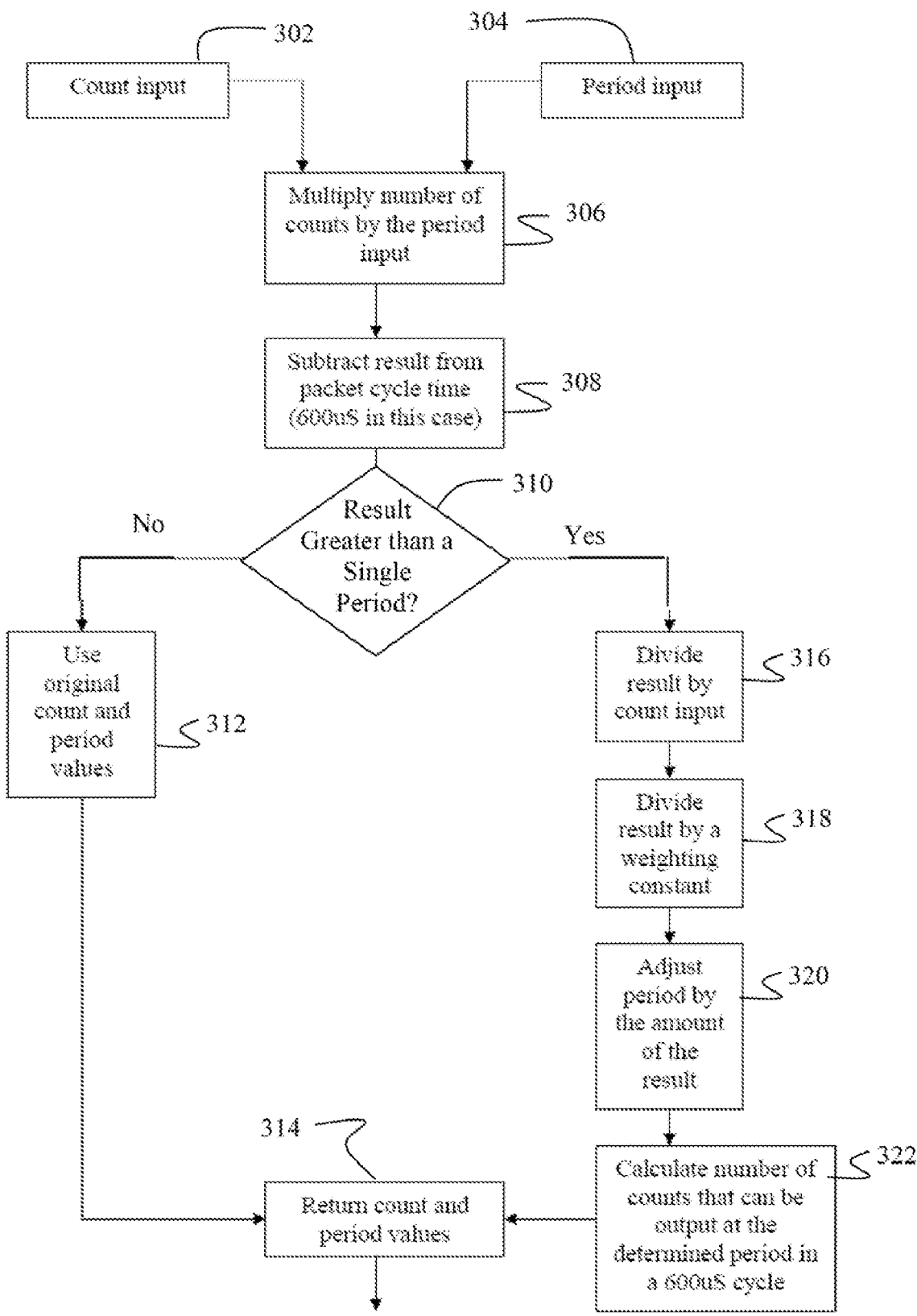
FIG. 3 is a flow chart of an exemplary data smoothing for resumption of new packet data after packet loss.

If based on the time gated entry a determination is made that a data packet has been dropped and no new data has been received a flag is set in the processor and the stored encoder statistics for position, velocity and acceleration are employed to estimate the data 220 which would have been received. The processor, responsive to the data loss flag, calculates sensor position and speed 210 using the estimated data. Additionally, a data loss counter is incremented 222. Upon exceeding a predetermined data loss count, the emergency stop output 32 is provided to the control system to allow the monitored machine/process to be shut down based on loss of data integrity. For an exemplary embodiment employing the 2500 cycle rotary encoder previously described in an overhead crane control system, an emergency stop count equal to approximately 160 msec is desired. This count corresponds to $\frac{1}{100}^{th}$ of an inch in motion of the crane. With a transmission cycle time for the transceivers of 600 μsec this corresponds to 267 loss counts resulting from lost packets. Upon receipt of the next new data packet, the data loss counter is reset and the processor compares the last estimated data calculation and the new calculation based on new data and if a data divergence which is unrecoverable is present, an emergency stop output is issued from the processor. Smoothing of the data from last calculated or estimated data points to the new data points based on actual data to avoid control discontinuities may be employed by the processor. FIG. 3 provides an exemplary flow chart for data smoothing as accomplished in the present invention.

Data provided by the encoder for the exemplary embodiment in the form of a count input 302 and a period input 304 is received by the processor and the number of counts is multiplied by the period 306. The result is subtracted from the packet cycle time 308 to provide a figure of merit to determine if smoothing is necessary 310. If the result is not greater than a single period the processor forwards the data as received 312 for return 314 to create the reconstructed output encoder data as shown in FIG. 2. If the result in greater than a single period the result is divided by the count input 316 and further operated on by a predetermined weighting constant 318. The period is then adjusted by the amount of the modified result 320. A number of counts that can be output at the adjusted period in one packet cycle time is calculated 322 and the adjusted period and calculated count value are returned as the count and period values 314 to create the reconstructed output encoder data.

In the described embodiment, since the sensor is connected to mechanical equipment, physical properties such as inertia provide an appropriate basis for estimating dropped data packets. At the high data streaming rate, missing a number of packets is not terribly consequential, as there is only so much change in position and/or speed that could take place in the duration of the missing data.

The major difference between the invention disclosed herein and typical 'data recovery' algorithms (such as used in CD audio recovery) is that recovering the exact data that was lost is not required. After a period of data loss, an update of the current position and speed of the sensor will be received and compared to the position and speed of the output calculated from the estimated data. This creates a new input for the processor algorithm, and a new output speed and position target is generated based on the reconstructed encoder data received. In alternative embodiments many different aspects of the particular algorithm are adjusted, such as taking into account the actual physical inertia of the machine that the sensor is connected to. This addition helps 'tune' the system, much like a standard motor controller or servo system can be tuned for its environment. These variables may be static, set at the factory, or they can be indeed variable, and adjustable by appropriate input to the processor.

In exemplary embodiments, the transceiver link with appropriate security encoding is employed to transmit the variables to the processor in the receiver element. Frame formatting of packets for data or instruction content in the packet is employed as known in the art.

In specific exemplary embodiments for rotating machinery sensing and control, two distinct categories of algorithms for use in the system control processor employing the quadrature output of the sensor data are available titled for ease of description herein as "speed-lock" and "position-lock". In the speed-lock algorithm, maintaining the correct period of the output signal is the desired emphasis, with actual angular or linear position ignored for calculation purposes. Many motor controllers do not use control sensors as position feedback, but rather just as feedback that the motor is moving at the proper rate. The speed-lock algorithm tends to have superior noise recovery, as it does not have to maintain positional accuracy in addition to speed. The position-lock algorithm, however, compares the desired output position to the position of the sensor as defined by the quadrature data, and maintains that relationship. Any difference in position must be corrected, even if that means outputting an incorrect speed to make up that difference. This is where the two algorithms differ most, as the speed-lock will forgo the position relationship in order to maintain a correct speed relationship.

Figure 4:
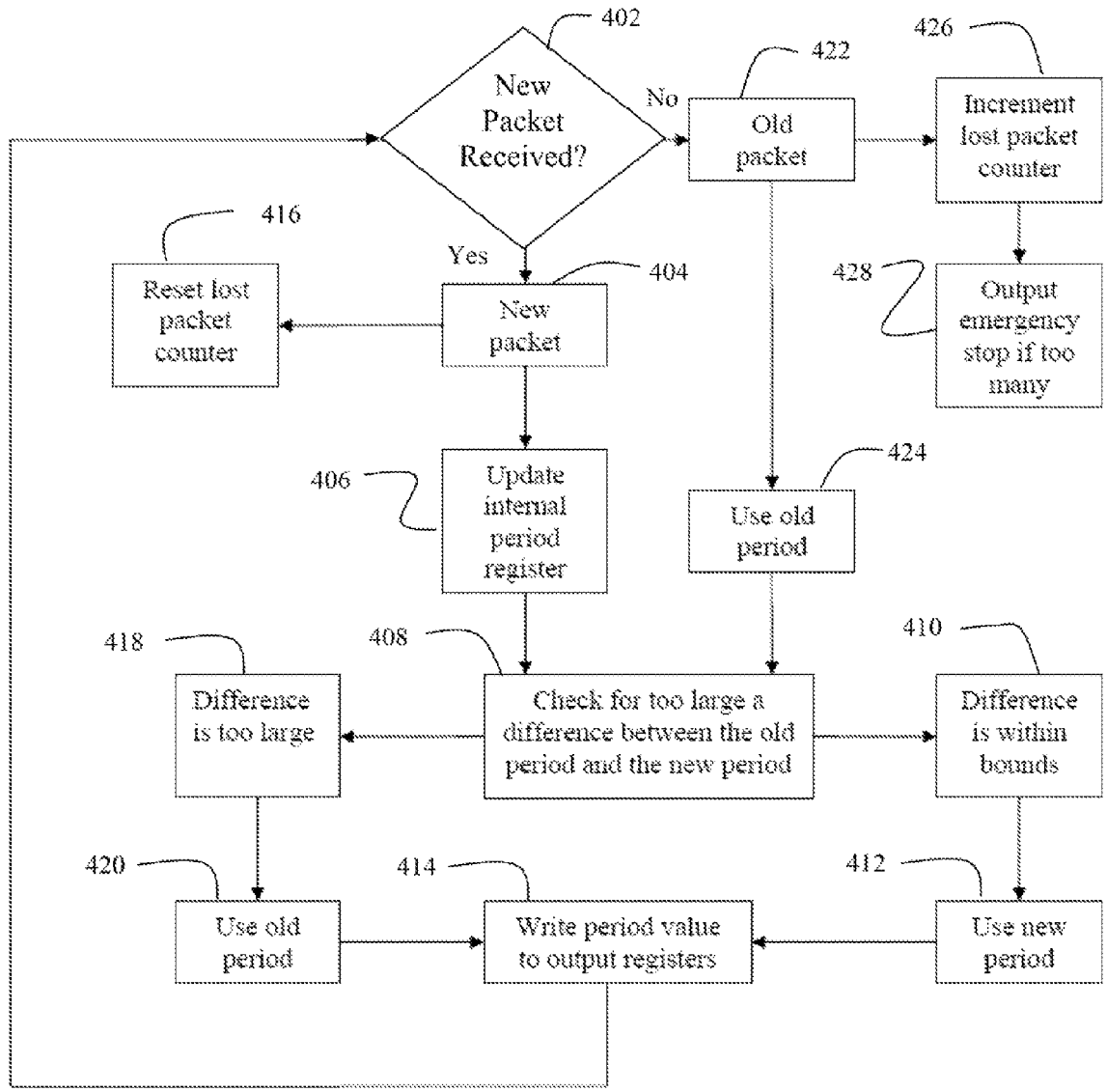
FIG. 4 is a flow chart of an exemplary first data control algorithm for use in an embodiment of system employing the invention; and, FIG. 5 is a flow chart of an exemplary second data control algorithm for use in an embodiment of a system employing invention.

An exemplary speed lock processing method is shown in FIG. 4. As previously described, the processor makes a determination if a new packet has been received 402. If so, the data from the new packet 404 is employed to update the internal period register 406. A check is made for the difference between the old period and the new period 408. A determination that the difference is less than a predetermined value 410 results in use of the new period 412 for process control information and the period value is written to the output registers 414. Receipt of a new packet results in resetting of the packet data counter 416. If the difference is larger than the predetermined value 418, the old period from stored data is employed 420 and written to the output registers.

If no new packet is received, the old packet from stored data is retrieved 422 and the period from the old data is employed for calculations 424 and input for the difference check. The lost packet counter is incremented 426 and an emergency stop is output 428 if the predetermined stop count is exceeded.

Figure 5:
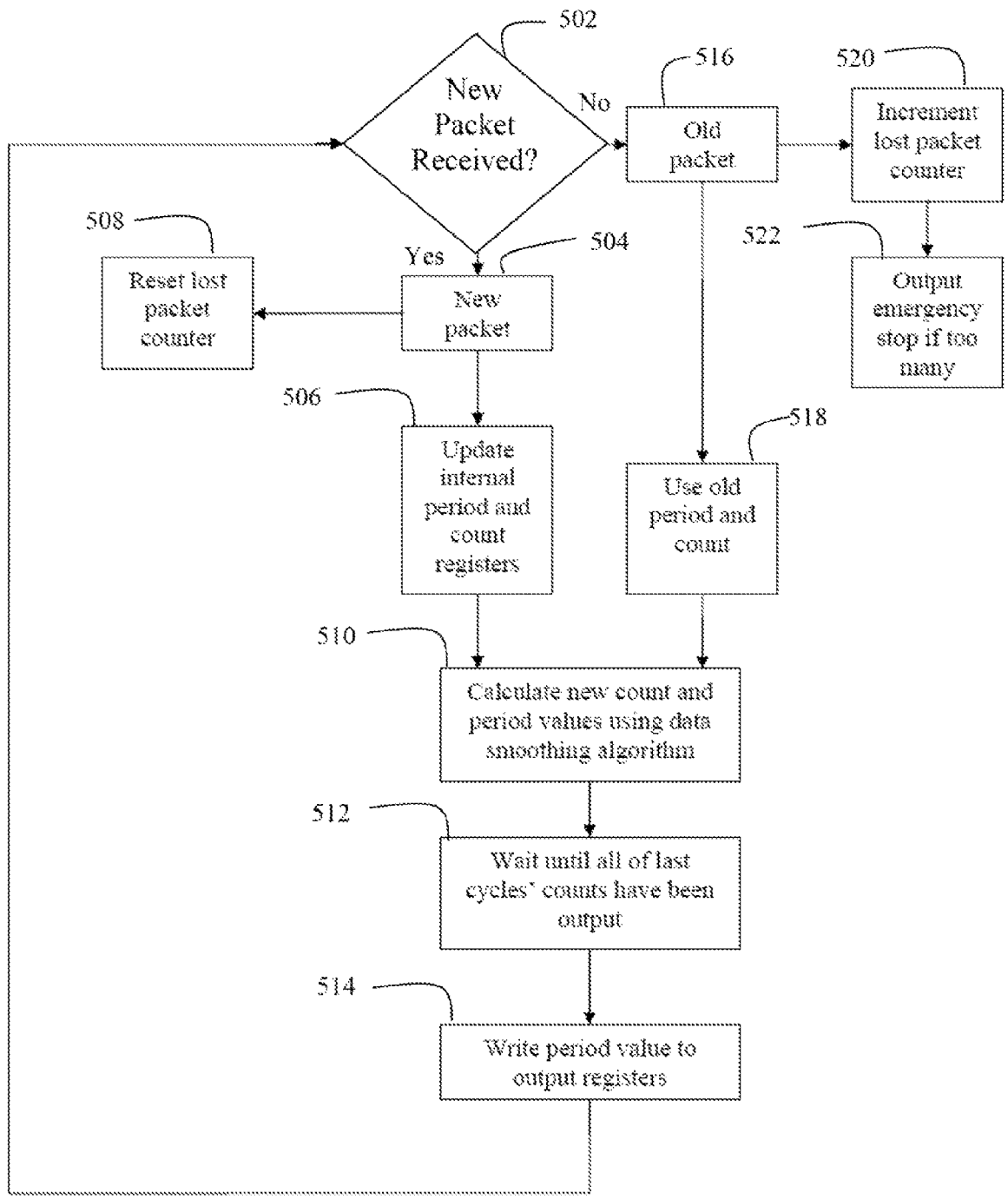

An exemplary position lock processing method is shown in FIG. 5. Determination of the receipt of a new packet is accomplished 502 and, if so, the new packet is provided 504 for updating of the internal period and count registers 506 and the lost packet counter is reset 508. A new output count is calculated 510 with the period value using the data smoothing process as disclosed in FIG. 3. The processor then waits for all counts from the last cycle to be output 512 and then writes the period value to the output register 514.

If no new packet has been received, data from the old packet 516 is retrieved and the old period and count are provided 518 for use in calculations for output count using the smoothing process. The lost packet counter is incremented 520 and if the predetermined emergency stop count is exceeded and emergency stop is output 322.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A wireless data transmission system comprising:
   a process sensor providing an output for process monitoring data, wherein the data includes data relating to a period;
   a transmitter connected to the output of the sensor and transmitting the data in time gated intervals;
   a receiver to receive the data from the transmitter;
   means connected to the receiver for determining if new data is received at a gated time interval;
   means, connected to the means for determining, for using a period from the new data and updating an internal period register if new data is received;
   a processor connected to the receiver and having means for calculating process parameters based on the data received, wherein the processor is configured to calculate the difference between the period from the new data and a period from prior data;
   means for storing a set of the calculated process parameters, wherein the means for storing comprises:
      means for using the new period and writing the new period to the period register if the difference between the period from the new data and the period from the prior data is less than a predetermined value; and
      means for using the prior period and writing the prior period to the period register if the difference between the period from the new data and the period from the prior data is larger than the predetermined value;
   the processor further having means for estimating process parameters based on the stored set of calculated process parameters, said estimating means responsive to a signal from the determining means; and
   means for output of the process parameters.

2. A wireless data transmission system as defined in claim 1 further comprising a counter responsive to the determining means, said counter providing a flag signal upon reaching a predetermined number of counts.

3. A wireless data transmission system as defined in claim 1 wherein the process sensor is a motion sensor.

4. A wireless data transmission system as defined in claim 3 wherein the process parameters are speed and position.

5. A wireless data transmission system as defined in claim 4 wherein the means for estimating includes means for calculating velocity and acceleration and said estimated process parameters are calculated based on the velocity and acceleration.

6. A wireless data transmission system as defined in claim 1 wherein the processor further includes means for smoothing process parameter output responsive to the determining means, wherein the smoothing means smoothes from estimated process parameters to actual process parameters based on data received subsequent to estimating process parameters.

7. A method for wireless data transmission comprising the steps of:
   providing a process sensor;
   obtaining an output from the sensor for process monitoring data, wherein the data includes data relating to a period;
   connecting a transmitter to the output of the sensor and transmitting the data in time gated intervals;
   providing a receiver and receiving the data from the transmitter;
   determining if new data is received at a gated time interval;
   if new data is received, using a period from the new data;
   updating an internal period register;
   calculating process parameters based on the data received, wherein the calculating comprises calculating the difference between the period from the new data and a period from prior data;
   storing a set of the calculated process parameters, wherein the storing comprises:
      if the difference between the period from the new data and theperiod from the prior data is less than a predetermined value, using the new period and writing the new period to the period register; and
      if the difference between the period from the new data and the period from the prior data is larger than the predetermined value, using the prior period and writing the prior period to the period register;
   estimating process parameters based on the stored set of calculated process parameters, said estimating responsive to a determination that new data has not been received at the gated time interval; and
   outputting the process parameters.

8. A method as defined in claim 7 further comprising:
   counting lost data packets based on the determination that new data has not been received and
   providing a flag signal upon reaching a predetermined number of counts.

9. A method as defined in claim 8 further comprising providing an emergency stop signal upon reaching a predetermined number of counts requiring an emergency stop.

10. A method as defined in claim 7 wherein the process sensor is a motion sensor.

11. A method as defined in claim 10 wherein the process parameters are speed and position.

12. A method as defined in claim 11 wherein the step of estimating includes calculating velocity and acceleration and said step of estimating process parameters comprises calculating the process parameters based on the velocity and acceleration.

13. A method as defined in claim 7 further comprising the steps of smoothing process parameter output responsive to a determination of the presence of new data, wherein the smooth is accomplished from estimated process parameters to actual process parameters based on data received subsequent to estimating the process parameters.

14. A method as defined in claim 13 wherein the data is count and period and the step of smoothing comprises the steps of:
  receiving the count input and period input;
  multiplying the number of counts by the period:
  subtracting the multiplied result from a packet cycle time;
  if the subtracted result is greater than a single period, dividing the result by the count input;
  adjusting the period by the amount of the result;
  calculating the number of counts that can be output at the adjusted period in the packet cycle time; and,
  returning the calculated number of counts and the adjusted period as count and period values.

15. A method as defined in claim 14 further comprising a step after the step of dividing the result of dividing the quotient by a predetermined weighting constant.

16. A method as defined in claim 7 wherein the step of estimating includes the prior step of transmitting through the transmitter a variable set for use in estimating the process parameters.

17. A method as defined in claim 16 wherein the variable set includes inertia based information on the process.

18. A method for wireless data transmission comprising the steps of:
  providing a process sensor:
  obtaining an output from the sensor for count and period;
  connecting a transmitter to the output of the sensor and transmitting the count and period as packets in time gated intervals:
  providing a receiver and receiving the packets from the transmitter;
  determining if a new packet is received at a gated time interval;
  if a new packet is received, using count and period data from the new packet;
  updating an internal period register;
  calculating the difference between the period from the new packet and the period from the prior packet;
  if the calculation is less than a predetermined value, using the new period and writing the period value using the new period to the output register;
  if the calculation is larger than the predetermined value, using the prior period and writing the prior period to the output register;
  outputting the process parameters;
  counting lost data packets based on the determination that new data has not been received and
  providing an emergency stop signal upon reaching a predetermined number of counts.

19. A method for wireless data transmission comprising the steps of:
  providing a process sensor;
  obtaining an output from the sensor for count and period;
  connecting a transmitter to the output of the sensor and transmitting the count and period as packets in time gated intervals;
  providing a receiver and receiving the packets from the transmitter;
  determining if a new packet is received at a gated time interval;
  if a new packet is received, using count and period data from the new packet and resetting a lost packet counter;
  if a new packet has not been received, using stored old count and period data and incrementing the lost packet counter;
  updating an internal period register;
  multiplying the number of counts by the period;
  subtracting the multiplied result from a packet cycle time;
  if the subtracted result is greater than a single period, dividing the result by the count input;
  adjusting the period by the amount of the result;
  calculating the number of counts that can be output at the adjusted period in the packet cycle time;
  outputting the calculated number of counts;
  writing the period value to the output register upon completion of the output of the counts of the last cycle; and,
  providing an emergency stop signal upon reaching a predetermined number in the lost packet counter.

* * * * *